(12) United States Patent
Calvarese

(10) Patent No.: US 8,798,923 B2
(45) Date of Patent: Aug. 5, 2014

(54) NON-ECHO ULTRASONIC DOPPLER FOR CORRECTED INERTIAL NAVIGATION

(71) Applicant: Symbol Technologies, Inc., Schaumburg, IL (US)

(72) Inventor: Russell E. Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/660,046

(22) Filed: Oct. 25, 2012

(65) Prior Publication Data
US 2014/0121961 A1 May 1, 2014

(51) Int. Cl.
G01C 21/12 (2006.01)
G01C 21/16 (2006.01)
G01S 11/14 (2006.01)

(52) U.S. Cl.
CPC .............. G01C 21/12 (2013.01); G01C 21/165 (2013.01); G01S 11/14 (2013.01)
USPC ........................................................ 701/495

(58) Field of Classification Search
CPC .............. G01S 3/00; G01S 1/38; G01C 21/12
USPC ........................................................ 701/495
See application file for complete search history.

(56) References Cited

U.S. PATENT DOCUMENTS 2,914,763 A 11/1959 Greenwood, Jr. et al.
3,028,592 A 4/1962 Parr et al.
5,847,673 A 12/1998 DeBell
6,061,021 A 5/2000 Zibell
6,246,960 B1 6/2001 Lin
6,876,945 B2 4/2005 Emord
7,283,423 B2 10/2007 Holm et al.

(Continued)

FOREIGN PATENT DOCUMENTS

CN 202019454 U 10/2011
CN 1026621157 A * 4/2012 ................ G01S 1/76
WO 2011117739 A2 9/2011

OTHER PUBLICATIONS

Horemuz, Milan, "Infrastructure for navigation in urban and indoor areas—feasibility study" Aug. 2009, Royal Institute of Technology, Department of Transport and Economics, Division of Geodesy.*

(Continued)

Primary Examiner — Mary Cheung
Assistant Examiner — Brian P Sweeney
(74) Attorney, Agent, or Firm — Brian M. Mancini

(57) ABSTRACT

A method and device for non-echo ultrasonic Doppler used for corrected inertial navigation includes providing at least one ultrasonic emitter within an environment, each emitter configured for transmitting an ultrasonic tone of a predefined frequency. An initial location of the mobile device is established within the environment. Dead reckoning procedures are initiated using sensors within the mobile device. The device receives at least one ultrasonic tone from an emitter, and converts the at least one ultrasonic tone into a digital waveform. The device determines at least one peak frequency of the digital waveform, and subtracts the at least one peak frequency from each predefined frequency to determine at least one Doppler shift, which is used for correcting the dead reckoning of the mobile device.

18 Claims, 2 Drawing Sheets

(56) References Cited

U.S. PATENT DOCUMENTS

| | | |
|---|---|---|
| 7,796,471 B2 * | 9/2010 | Guigne et al. .............. 367/128 |
| 2009/0207694 A1 | 8/2009 | Guigne et al. |
| 2009/0312038 A1 | 12/2009 | Gildea |
| 2010/0271263 A1 | 10/2010 | Moshfeghi |
| 2012/0087212 A1 | 4/2012 | Vartanian et al. |
| 2012/0088606 A1 | 4/2012 | Mathews et al. |

OTHER PUBLICATIONS

"Positioning with Independent Ultrasonic Beacons" undated by Michael McCarthy and Henk Muller, Department of Computer Science, University of Bristol, UK Technical Report CSTR-05-005.

International Search Report and Written Opinion for counterpart International Patent Application No. PCT/US2013/064929 mailed Feb. 11, 2014.

* cited by examiner

NON-ECHO ULTRASONIC DOPPLER FOR CORRECTED INERTIAL NAVIGATION

FIELD OF THE DISCLOSURE

The present disclosure relates generally to an ultrasonic system, and more particularly to non-echo ultrasonic Doppler used for corrected inertial navigation.

BACKGROUND

Inertial navigation has been in use for a considerable amount of time. In operation, given an initial position of a device, its position can be tracked using various sensors that detect a change in inertia in the device. However, to provide accurate tracking the sensors being used must be very sensitive and accurate. This is impractical for tracking a device such as a smart phone or other mobile communication device. In particular, inertial navigation using the relatively inaccurate motion sensors found in smart phones is a difficult problem due to drift, accumulated calculation error, and the inability to provide the system with a known instant where all motion has stopped, i.e. the sensors and associated processing in a smart phone may be unable to determine whether the device is moving at a slow, constant rate or it is stopped.

Doppler assisted inertial navigation (DAIN) was introduced to augment inertial navigation system by measuring a frequency shift from an echo of a signal being broadcast by the device. These systems combine Doppler velocity measurements that inherently don't drift in order to correct inertial systems that have significant drift. Many such systems were based upon radar signals from the ground to targets in the air. Similar echo-based techniques were applied using acoustics for the autonomous navigation of underwater vehicles. In this configuration, sonar provided the Doppler information. More specific to the scope of the present invention, systems were proposed that place an echo-based Doppler transceiver in a mobile computer to provide the DAIN function. However, adding such a system to a smart phone would add a significant cost and complexity.

Accordingly, there is a need for a technique to correct inertial navigation in a mobile device. It would also be beneficial if this could be accomplished in a smart phone without modification of its existing hardware.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
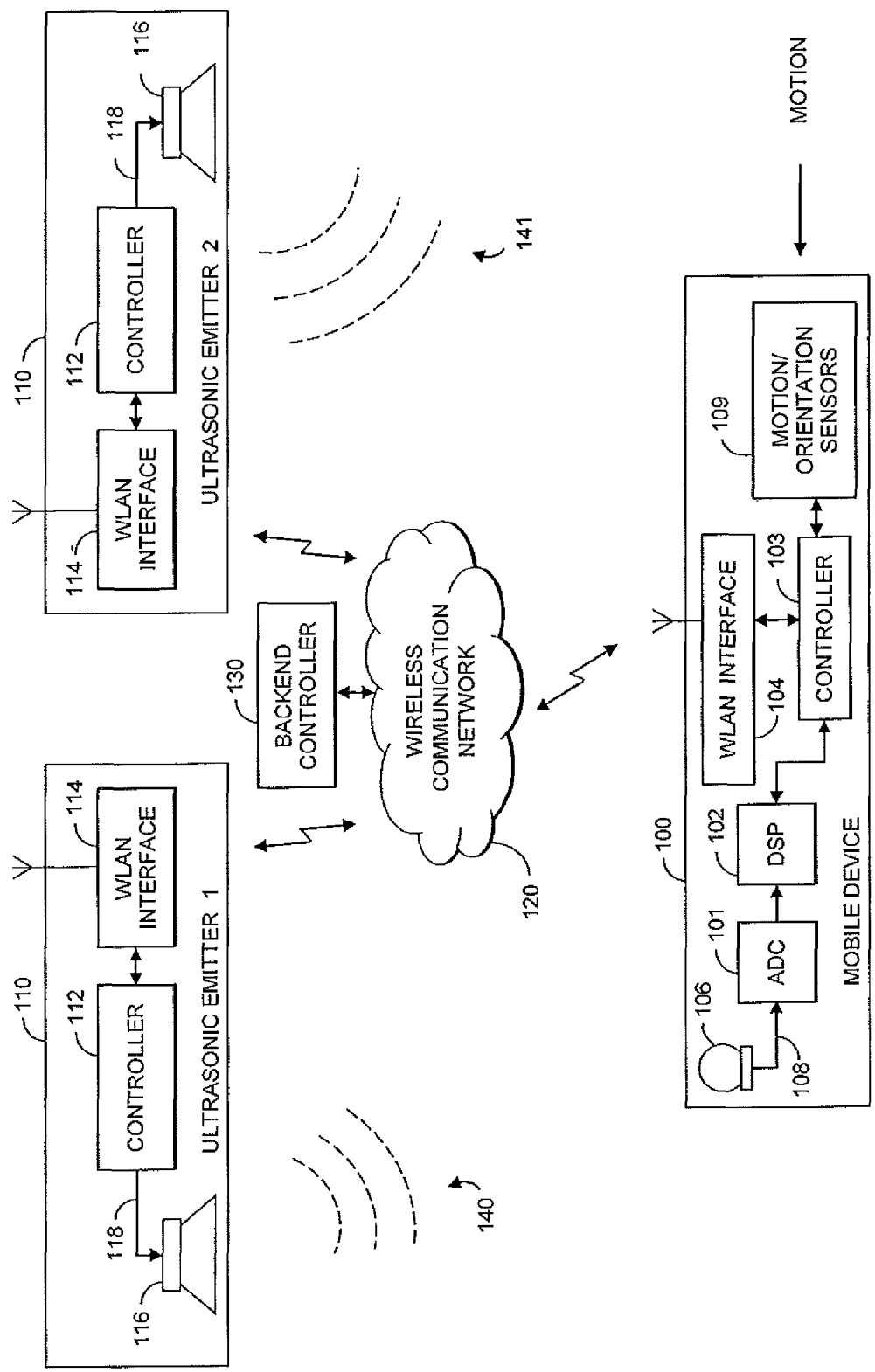
FIG. 1 is a simplified block diagram of an inertial navigation system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a technique is described to provide an improved inertial navigation system for a mobile communication device. The present invention has the advantage of using a standard mobile device, such as a smart phone, without any change in hardware, i.e. a Doppler transceiver is not used or needed. The present invention also uses a single path (non-echo based) Doppler technique that provides a much better signal-to-noise ratio (SNR) than a standard echo based Doppler technique. The present invention provides specific advantages over a dedicated Doppler transceiver in a device, in that, the present invention does not use echoing that would rely on nearby reflective surfaces that may not be present in the environment, and the zero velocity case is not ambiguous with an echo from the floor or other surface parallel to a direction of motion. It is envisioned that the present invention can be implemented by a custom application that is downloaded to a smart phone and is usable in an environment with pre-disposed ultrasonic emitters dispersed therein.

The mobile device described herein can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a device. Each device comprises a processor that can be further coupled to a keypad, a speaker, a microphone, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic Doppler system, in accordance with the present invention. At least one ultrasonic transponder such as a piezoelectric speaker or emitter 116 can be disposed within the environment. Each emitter can send a short burst of ultrasonic sound (e.g. 140, 141) at a preset frequency (e.g. 20 kHz) in the frequency range of about 17-22.05 kHz within the environment. The mobile device 100 can include audio circuitry and a digital signal processor 102 to process the ultrasonic tones 140, 141. For example, the tones can be received from the emitters by a transponder such as a microphone 106, and the digital signal processor is used specifically to analyze the frequency (and amplitude) components of a captured waveform of the tones 140, 141 from the ultrasonic emitters 116, in accordance with the present invention.

In particular, the circuit of the microphone 106 provides electrical signals 108 to receiver circuitry that can include an amplifier (not shown) and an analog-to-digital converter 101 that converts the ultrasonic burst into a digital waveform which is then sampled by a digital signal processor 102 while the waveform is being captured. It is envisioned that the mobile device will have existing audio circuitry with available sampling frequencies as high as 44.1 kHz, i.e. the typically utilized sampling frequency for commercial audio devices, which relates to a 22.05 kHz usable upper frequency limit for processing audio signals. It is envisioned that waveform processing and analysis is implemented in the digital domain, in the digital signal processor 102. It should be recognized that other components, including amplifiers, digital filters, and the like, are known in the art and are not shown for the sake of simplicity of the drawings. For example, the microphone signals can be amplified in an audio amplifier and filtered using digital or analog filtering.

The digital signal processor 102 can also be coupled to a controller 103 and wireless local area network interface 104 for wireless communication with other devices in the communication network 120 such as a backend controller 130. The mobile device controller 103 or backend controller 130 can be used to provide a Doppler information processing engine for the mobile device utilizing the frequency shift characteristics of each tone, as will be detailed below.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity. The mobile device 100 also could be connected to the communication network 120 through a wired interface connection (not shown), such as an Ethernet interface connection.

Each ultrasonic emitter(s) 110 can include a simple piezoelectric device hard-wired to emit a periodic ultrasonic tone 140 at one frequency. Optionally, the emitter(s) 110 can include a controller 112 that can change the timing and frequency of the ultrasonic signal 118 to be emitted. In the simplest example, the emitter is configured to have usable output across a 17-22.05 kHz frequency range and to repeat a single tone, from within that frequency range. The 17-22.05 kHz range has been chosen such that the existing audio circuitry of the mobile device will be able to detect the bursts without users hearing significant noise from the system.

In practice, a typical smart phone microphone frequency response is well over the 20 kHz that is usually quoted. This 20 kHz limit is mainly quoted since 20 kHz is the upper end of human hearing, as such, the highest frequency that needs to be considered ordinarily. In addition, manufacturers will state limits of the codec sampling frequency (i.e. Nyquist frequency) that are lumped into a system specification that does not consider the microphone alone. Further, the manufacturers list a codec amplifier response and DC blocking components in series with various stages. However, a few dB/per octave roll off still provides sufficient usable response up to 22 kHz. Therefore, the present invention utilizes this extra ultrasonic capacity of smart phone audio circuitry as described herein.

It is envisioned that the emitters are affixed to a ceiling of the indoor environment, with the emitters oriented to emit a downward burst towards a floor of the environment. Different emitters that are spatially dispersed within the environment can emit the same or different ultrasonic frequencies. In the present invention, ultrasonic tones are typically provided from an emitter broadcasting with a burst duration of about 200 milliseconds.

In operation, the controller 103 of the mobile device will establish an initial location of the mobile device within the environment and initiate dead reckoning procedures using existing motion/orientation sensors 109 within the mobile device. This can occur such as when the device enters an environment, such as a retail store, at a known point, or by using known locationing techniques, such as TDOA and the like. A microphone circuit 106, 108 of the mobile device can then receive at least one ultrasonic tone 140, 141 of at least one predefined frequency transmitted from at least one emitter 116 in the environment. An analog-to-digital converter 101 coupled to microphone circuit and operable to convert the ultrasonic tone into a digital waveform.

The mobile device will utilize its existing audio processing circuitry such as a digital signal processor 102 (DSP) to analyze the waveform in the frequency domain, i.e. a Fast Fourier Transform (FFT).

Once the digital waveform is provided, the digital signal processor of the mobile device will use a Fast Fourier Transform (FFT). Optionally, the DSP can high pass filter the digital waveform. The FFT returns the peak frequency (and amplitude) of each signal present in the environment. Further, subtracting the determined peak frequency from a known transmitted frequency, established by the network, yields the Doppler frequency shift which indicates the component speed towards or away from the transmitter. The controller can then correct the dead reckoning of the mobile device using at least one Doppler frequency shift of the received tones from the particular emitters at their particular locations. The FFT also allows the processor to discern a received signal strength indication (RSSI) of tones received from each emitter.

In one embodiment, different ultrasonic frequencies 140, 141 can be used by different emitters 110 at different particular locations. In this case, each tone can be broadcast simultaneously with other tones from other emitters, which will provide a higher information refresh rate. When the digital signal processor performs a FFT on these simultaneous signals, several frequency peaks can be found. In order to avoid processing complexity, it would be desirable to select these frequencies such that they can be easily discerned by the DSP. In addition, these signal frequencies are subject to Doppler shifts due to a user moving around the environment. Therefore, selected frequencies must be separated by a sufficient amount to provident overlapping of frequencies due to Doppler. Due to Doppler shifts that can occur with a mobile device, the amount of discernable frequency tones that can be accurately recognized within the available ultrasonic frequency range is limited. In the ultrasonic band of interest (17 kHz to 22.05 kHz), it is possible to distinguish a total of up to twenty distinct tones while still leaving room for as much as +/−125 Hz of Doppler shift (more than enough margin to accommodate that which would be present from a very fast walking speed).

In another embodiment, the same ultrasonic frequency 140, 141 can be used by all emitters 110. In this case, each emitter will broadcast its tone separated in time from other emitters. Although this provides a lower information refresh rate than the first embodiment, it is much simpler and more accurate to implement. When the digital signal processor performs a FFT on this signal, one frequency peak will be found in each specified time period. In order to know which emitter/location is broadcasting a tone, it is necessary that the mobile device and the emitter controller have synchronized clocks such that a particular time that a tone is received indicates a particular emitter in a particular location. This can be done by the exchange of a reference time or timestamps between the mobile device, backend controller, and possibly the emitters themselves.

Alternatively, the mobile device can send the peak frequencies (and depending on the embodiment an optional timestamp of the receipt of these tones) it detects over the communication network 120 to a backend controller 130 that can determine the Doppler shifts and to identify the emitters/locations that originally broadcast the tones, given a known planogram of the emitter locations in the environment. In this way the backend controller can send calculated velocity information back to the mobile device for it to correct its inertial navigation. Alternatively, the mobile device can also send its inertial navigation information directly to the backend controller for the controller to correct.

It should be recognized that the particular tones of the ultrasonic emitter devices could be changed during operation. Choosing which tones to use can be coordinated by the backend controller 130 of the locationing system, which can communicate over the communication network 120 to direct each emitter 110 to emit the same specific tone periodically at the same or different particular time periods depending on other non-inertial navigation communication traffic being used in the system.

In practice, the accuracy in measuring Doppler is generally good for "in-view" line-of-sight emitters, with the ability to measure ¼ MPH accuracy towards or away from the transmitter. For the non-line-of-sight emitters, reflections sometimes cause a result of the opposite direction inasmuch as magnitude is affected by the angle of the reflector. Even with reflections, the result is more often than not reasonably close. In addition, the zero velocity case is always very accurate which is important since the sensors of a smart phone have difficulty in this case, adversely affecting inertial navigation drift.

Figure 2:
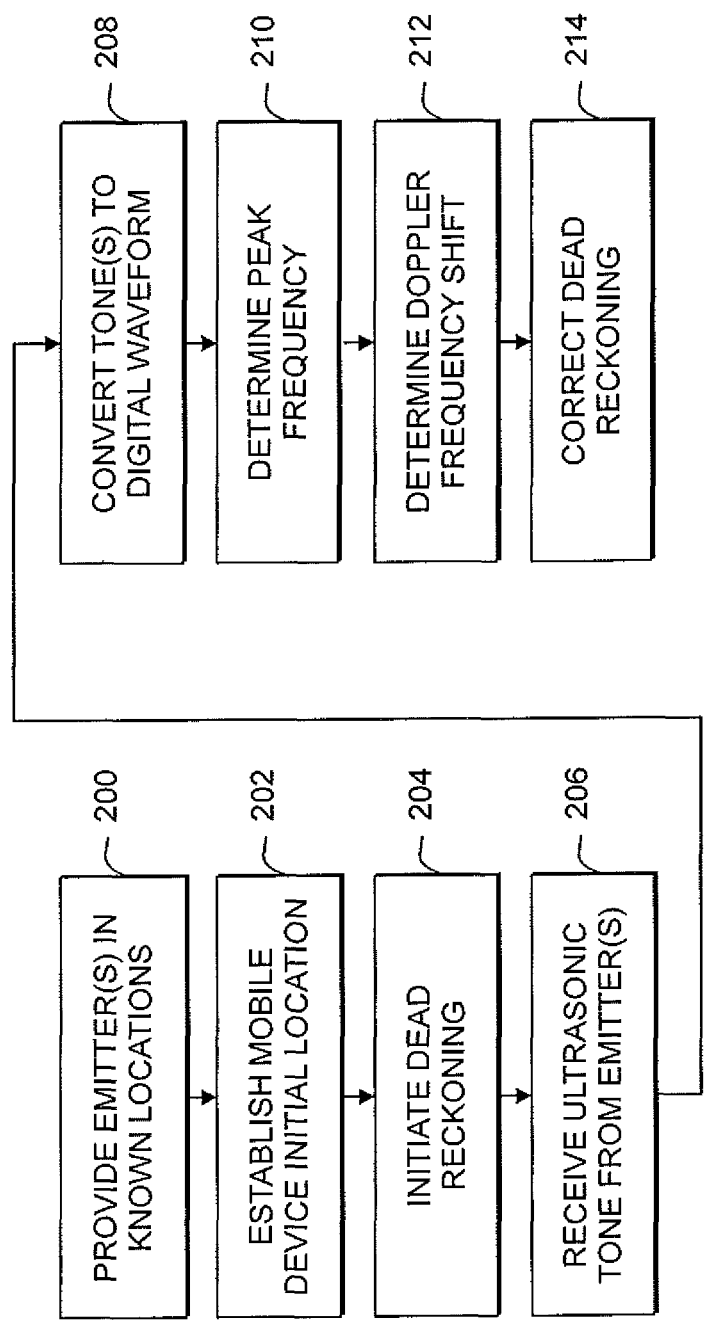
FIG. 2 is a flow diagram illustrating a method for inertial navigation, in accordance with the present invention.

FIG. 2 is a diagram illustrating a method non-echo ultrasonic Doppler used for corrected inertial navigation, according to some embodiments of the present invention. It is envisioned that the method utilizes existing audio circuitry hardware of the mobile device.

A first step 200 providing at least one ultrasonic emitter within an environment, each emitter configured for transmitting an ultrasonic tone of a predefined frequency. Although one emitter can provide usable information, it is desired to have two or more emitters in the environment. It is envisioned that each ultrasonic tone has a known and preset frequency between 17 kHz and 22.05 kHz. Emitters can all broadcast the same tone or can broadcast different tones. For example, in one embodiment, each emitter transmitting a different frequency ultrasonic tone simultaneously with other emitters. As each emitter has a different known location in the environment, recognizing each particular frequency will identify that emitter and its location. In another embodiment, each emitter transmits the same frequency ultrasonic tone separated in time from other emitters. As each emitter has a different known location in the environment, recognizing a particular time of transmission will identify that emitter and its location. In this case, it is necessary that the mobile device and the emitter controller have synchronized clocks.

A next step 202 includes establishing an initial location of the mobile device within the environment. This can be done using known locationing means, such as TDOA for example. Or this can be done simply by knowing the location of the entrance of the building where the mobile device initially enters the environment.

A next step 204 includes initiating dead reckoning procedures using sensors within the mobile device, such as a gyroscope, accelerometer, and magnetometer in order to follow the position of the mobile device as its moves through the environment.

A next step 206 includes receiving at least one ultrasonic tone from an emitter.

A next step 208 includes converting the at least one ultrasonic tone into a digital waveform providing an ultrasonic sampling frequency from the audio codec. It is envisioned that the audio codec has a customizable sampling frequency setting between 20 kHz and 22.05 kHz. If the audio codec of the mobile device cannot be changed from a 44.1 kHz sample rate, then downsampling can be used to decimate this sample rate to 22.05 kHz. This step can also include high-pass filtering the digital waveform to remove audio artifacts.

A next step 210 includes determining at least one peak frequency of the digital waveform. This can include performing a Fast Fourier Transform on the waveform to derive its peak frequency component(s).

A next step 212 includes subtracting the at least one peak frequency from each predefined frequency to determine at least one Doppler shift.

A next step 214 includes correcting the dead reckoning of the mobile device using the at least one Doppler shift of the received tones from the particular emitters at their particular locations.

The present invention uses a determination of Doppler frequency shift of the emitter signals, received by the smart phone, from more than one emitter (if available), which relates to speed towards or away from each emitter. This is determined by the shift in the raw data buffer between the detected frequency peak of the waveform compared to what the preset tone frequency should be. In other words, the actual received frequency is subtracted from the known stationary frequency to obtain the Doppler shift. The speeds towards or away from the emitters yields the mobile device's inertial navigation correction using known Doppler techniques, with the exception that the velocity is simply half of what would be measured using standard echo-based techniques, inasmuch as the present invention is non-echo based.

The smart phone height is assumed to be four-feet above the floor. This reduces complexity and reduces the required number of "in view" emitters. The count of "in view" transmitters will vary as the smart phone is moved around the environment, and it is assumed that there will be times when less than three emitters will be "in view". Where the emitters are disposed on the ceiling and the smart phone is assumed to be four-feet above the floor, a solution is provided that is nothing more than taking the three-dimensional components and applying the sum of the squares to convert to two-dimensions. This solution does not introduce any computational complexity or CPU overhead.

Advantageously, the present invention provides a non-echo Doppler correction technique using a receiver running an audio codec, an audio microphone, and a digital signal processor, all of which are present in nearly every smart phone that is manufactured today. The present invention can be implemented using this existing hardware and a software application which could be downloaded and installed to use the existing hardware in the novel way described herein. The processing power to identify the frequency tone is minimal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of non-echo ultrasonic Doppler used for corrected inertial navigation of a mobile device, the method comprising the steps of:

providing at least one ultrasonic emitter within an environment, each emitter configured for transmitting an ultrasonic tone of a predefined frequency;

establishing, by a controller of the mobile device, an initial location of the mobile device within the environment;

initiating, by the controller of the mobile device, dead reckoning procedures using sensors within the mobile device;

receiving, by a microphone circuit of the mobile device, at least one ultrasonic tone of a predefined frequency transmitted from at least one of the emitters in the environment;

converting, by an analog-to-digital converter coupled to the microphone circuit of the mobile device, the at least one ultrasonic tone into a digital waveform;

determining, by a digital signal processor coupled to the analog-to-digital converter of the mobile device, at least one peak frequency of the digital waveform;

subtracting, by the digital signal processor, the at least one peak frequency from each predefined frequency to determine at least one Doppler shift; and correcting, by the controller of the mobile device, the dead reckoning of the mobile device using the at least one Doppler shift.

2. The method of claim 1, wherein transmitting, by the emitter, includes each emitter transmitting the same frequency ultrasonic tone separated in time from other emitters.

3. The method of claim 2, wherein establishing, by the controller, includes synchronizing clocks of the emitters and the mobile device, by the controller, such that a particular time that a tone is received indicating a particular emitter in a particular location, and wherein correcting, by the controller, includes correcting the dead reckoning of the mobile device using the Doppler shifts of the received tones from the particular emitters at their particular locations.

4. The method of claim 1, wherein transmitting, by the emitters, includes each emitter transmitting a different frequency ultrasonic tone simultaneously with other emitters.

5. The method of claim 1, wherein the mobile device utilizes existing audio circuitry for the method steps.

6. The method of claim 1, wherein converting, by the analog-to-digital converter, includes high pass filtering the digital waveform.

7. The method of claim 1, wherein determining, by the digital signal processor, includes using a Fast Fourier Transform on the digital waveform.

8. The method of claim 1, wherein converting, by the analog-to-digital converter, includes sampling the ultrasonic tone and downsampling the resulting sample tone.

9. A method of non-echo ultrasonic Doppler used for corrected inertial navigation of a mobile device, the method comprising the steps of:

providing a plurality of ultrasonic emitters in known locations within an environment, each emitter configured for transmitting an ultrasonic tone of a same predefined frequency;

establishing, by a controller of the mobile device, an initial location of the mobile device within the environment and synchronizing, by a backend controller and the controller, clocks of the emitters and the mobile device;

initiating, by the controller of the mobile device, dead reckoning procedures using sensors within the mobile device;

receiving, by a microphone circuit of the mobile device, an ultrasonic tone from different emitters in the environment at different times, the particular time that a tone is received indicating a particular emitter in a particular location;

converting, by an analog-to-digital converter coupled to the microphone circuit of the mobile device, each received ultrasonic tone into a digital waveform;

determining, by a digital signal processor coupled to the analog-to-digital converter of the mobile device, a peak frequency of each of the digital waveforms;

subtracting, by the digital signal processor, the peak frequency of each digital waveform from the predefined frequency to determine a Doppler shift for each received ultrasonic tone; and correcting, by the controller of the mobile device, the dead reckoning of the mobile device using the Doppler shifts of the received tones from the particular emitters at their particular locations.

10. The method of claim 9, wherein providing includes providing at least two emitters.

11. A mobile device configured to correct inertial navigation using non-echo ultrasonic Doppler, the mobile device comprising:

a controller operable to establish an initial location of the mobile device within the environment and initiate dead reckoning procedures using sensors within the mobile device;

a microphone circuit operable to receive an ultrasonic tone of a predefined frequency transmitted from at least one emitter in an environment;

an analog-to-digital converter coupled to microphone circuit and operable to convert the ultrasonic tone into a digital waveform; and a digital signal processor coupled to the analog-to-digital converter and operable to determine at least one peak frequency of the digital waveform, and subtract the at least one peak frequency from each predefined frequency to determine at least one Doppler shift, whereupon the controller can correct the dead reckoning of the mobile device using the at least one Doppler shift.

12. The device of claim 11, wherein each emitter transmitting the same frequency ultrasonic tone separated in time from other emitters.

13. The device of claim 12, wherein the controller is also operable to synchronize the clock of the mobile device with the clocks of the emitters such that a particular time that a tone is received indicates a particular emitter in a particular location, and wherein the controller can correct the dead reckoning of the mobile device using the Doppler shifts of the received tones from the particular emitters at their particular locations.

14. The device of claim 11, wherein each emitter is operable to transmit a different frequency ultrasonic tone simultaneously with other emitters.

15. The device of claim 11, wherein the mobile device utilizes existing audio circuitry.

16. The device of claim 11, wherein the digital signal processor is also operable to high pass filter the digital waveform.

17. The device of claim 11, wherein the digital signal processor is also operable to perform a Fast Fourier Transform on the digital waveform.

18. The device of claim 11, wherein the digital signal processor is also operable to sampling the ultrasonic tone and downsampling the resulting sample tone.

* * * * *